(12) United States Patent
Wang et al.

(10) Patent No.: US 11,403,191 B2
(45) Date of Patent: Aug. 2, 2022

(54) METHOD FOR BACKUP DESTINATION SELECTION, ELECTRONIC DEVICE, AND COMPUTER PROGRAM PRODUCT

(71) Applicant: EMC IP Holding Company LLC, Hopkinton, MA (US)

(72) Inventors: Ren Wang, Shanghai (CN); Zhen Jia, Shanghai (CN); Jing Yu, Shanghai (CN); Qi Wang, Shanghai (CN); Yun Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 76 days.

(21) Appl. No.: 17/078,510

(22) Filed: Oct. 23, 2020

(65) Prior Publication Data

US 2022/0083434 A1 Mar. 17, 2022

(30) Foreign Application Priority Data

Sep. 16, 2020 (CN) .......................... 202010973689.1

(51) Int. Cl.
*G06F 11/14* (2006.01)

(52) U.S. Cl.
CPC ...... *G06F 11/1469* (2013.01); *G06F 11/1451* (2013.01); *G06F 11/1461* (2013.01);
(Continued)

(58) Field of Classification Search
CPC ............. G06F 11/1448; G06F 11/1458; G06F 11/1469; G06F 11/1402
(Continued)

(56) References Cited

U.S. PATENT DOCUMENTS

2007/0204021 A1* 8/2007 Eki ..................... H04W 40/246
709/223
2011/0099328 A1* 4/2011 Gensler, Jr. ......... G06F 11/1469
711/111

(Continued)

*Primary Examiner* — Than Nguyen
(74) *Attorney, Agent, or Firm* — Womble Bond Dickinson (US) LLP

(57) ABSTRACT

Implementations of the present disclosure provide a method for backup destination selection, an electronic device, and a computer program product. In one method, in a storage device set, a first group of candidate subsets is obtained, and the number of storage devices included in candidate subsets in the first group of candidate subsets is determined based on the number of copies specified by a backup task. A first group of subset codes of the first group of candidate subsets is determined. A second group of subset codes is generated according to the first group of subset codes, and codes in the second group of subset codes uniquely identify the candidate subsets. Based on the first group of candidate subsets and a second group of candidate subsets corresponding to the second group of subset codes, a target subset is selected as a backup destination of the backup task. According to example implementations of the present disclosure, a corresponding apparatus, a corresponding electronic device, and a corresponding computer program product are provided. The implementations of the present disclosure can greatly reduce the amount of calculation for selecting the target subset, and thereby improving the automation level and performance of the storage system.

20 Claims, 10 Drawing Sheets

(52) U.S. Cl.
CPC ...... *G06F 11/1464* (2013.01); *G06F 11/1448* (2013.01); *G06F 11/1458* (2013.01)

(58) Field of Classification Search
USPC .......................................................... 711/162
See application file for complete search history.

(56) References Cited

U.S. PATENT DOCUMENTS

| | | | |
|---|---|---|---|
| 2015/0032983 A1* | 1/2015 | Kono | G06F 11/1461 |
| | | | 711/162 |
| 2015/0193312 A1* | 7/2015 | Nanivadekar | G06F 11/1458 |
| | | | 707/654 |
| 2018/0011643 A1* | 1/2018 | Calder | G06F 11/1458 |
| 2019/0171364 A1* | 6/2019 | Kripalani | G06F 3/0605 |
| 2019/0243722 A1* | 8/2019 | Calder | G06F 11/1458 |
| 2021/0185124 A1* | 6/2021 | Surcouf | H04L 67/1097 |

* cited by examiner

METHOD FOR BACKUP DESTINATION SELECTION, ELECTRONIC DEVICE, AND COMPUTER PROGRAM PRODUCT

CROSS-REFERENCE TO RELATED APPLICATION

This patent application claims the priority, under 35 U.S.C. § 119, of Chinese Patent Application No. 202010973689.1, filed Sep. 16, 2020, which is incorporated by reference in its entirety.

TECHNICAL FIELD

Implementations of the present disclosure generally relate to storage systems, and more particularly, to a method for backup destination storage device selection, an electronic device, and a computer program product.

BACKGROUND

Today, many companies or enterprises generate large amounts of data every day. For data security, data protection becomes more and more important. In this regard, a backup storage system can provide data protection, and can copy data to be backed up to multiple storage devices, thereby obtaining multiple data copies stored in different storage devices.

At present, it has been proposed to select a storage device subset that can be used as a backup destination based on states of multiple optional storage devices in a storage device set. For example, it is possible to set a score for the state of each storage device in the storage device set, and determine scores for generating various combinations (for example, based on permutations and combinations) of the storage device subsets. However, when there are a large number (for example, tens or more) of storage devices, there will be tens of thousands or even hundreds of thousands of combinations based on the number of storage devices involved in backup destinations. At this moment, when selecting the backup destinations, a huge amount of calculation will be involved, and therefore, it is impossible to provide a user with recommendations for the backup destinations effectively.

SUMMARY OF THE INVENTION

The implementations of the present disclosure propose a technical solution for determining a backup destination for data backup in a storage device set, and specifically provide a method for backup destination selection, an electronic device, and a computer program product.

In a first aspect of the present disclosure, a method for selecting a backup destination for a backup task is provided, including: obtaining a first group of candidate subsets in a storage device set, the number of storage devices included in candidate subsets in the first group of candidate subsets being determined based on the number of copies specified by the backup task; determining a first group of subset codes of the first group of candidate subsets, codes in the first group of subset codes uniquely identifying the candidate subsets in the first group of candidate subsets; generating a second group of subset codes according to the first group of subset codes, codes in the second group of subset codes uniquely identifying candidate subsets; and based on the first group of candidate subsets and a second group of candidate subsets corresponding to the second group of subset codes, selecting a target subset as the backup destination of the backup task.

In a second aspect of the present disclosure, an electronic device is provided. The electronic device includes: at least one processor; and at least one memory, storing computer program instructions, the at least one memory and the computer program instructions being configured to cause, with the at least one processor, the electronic device to perform an action of selecting a backup destination for a backup task. The action includes: obtaining a first group of candidate subsets in a storage device set, the number of storage devices included in candidate subsets in the first group of candidate subsets being determined based on the number of copies specified by the backup task; determining a first group of subset codes of the first group of candidate subsets, codes in the first group of subset codes uniquely identifying the candidate subsets in the first group of candidate subsets; generating a second group of subset codes according to the first group of subset codes, codes in the second group of subset codes uniquely identifying candidate subsets; and based on the first group of candidate subsets and a second group of candidate subsets corresponding to the second group of subset codes, selecting a target subset as the backup destination of the backup task.

In a third aspect of the present disclosure, a computer program product is provided. The computer program product is tangibly stored on a non-volatile computer-readable medium and includes machine-executable instructions. The machine-executable instructions, when being executed, cause a machine to perform steps of the method according to the first aspect.

It should be understood that the content described in the summary part is neither intended to limit key or essential features of the implementations of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the implementations of the present disclosure will become readily understandable by reading the following detailed description with reference to the accompanying drawings. In the accompanying drawings, several implementations of the present disclosure are shown by way of example but not limitation.

Throughout all the accompanying drawings, the same or similar reference numerals are used to indicate the same or similar components.

DETAILED DESCRIPTION

The principles and spirit of the present disclosure will be described below with reference to several example implementations shown in the accompanying drawings. It should be understood that these implementations are described only for the purpose of enabling those skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

Figure 1:
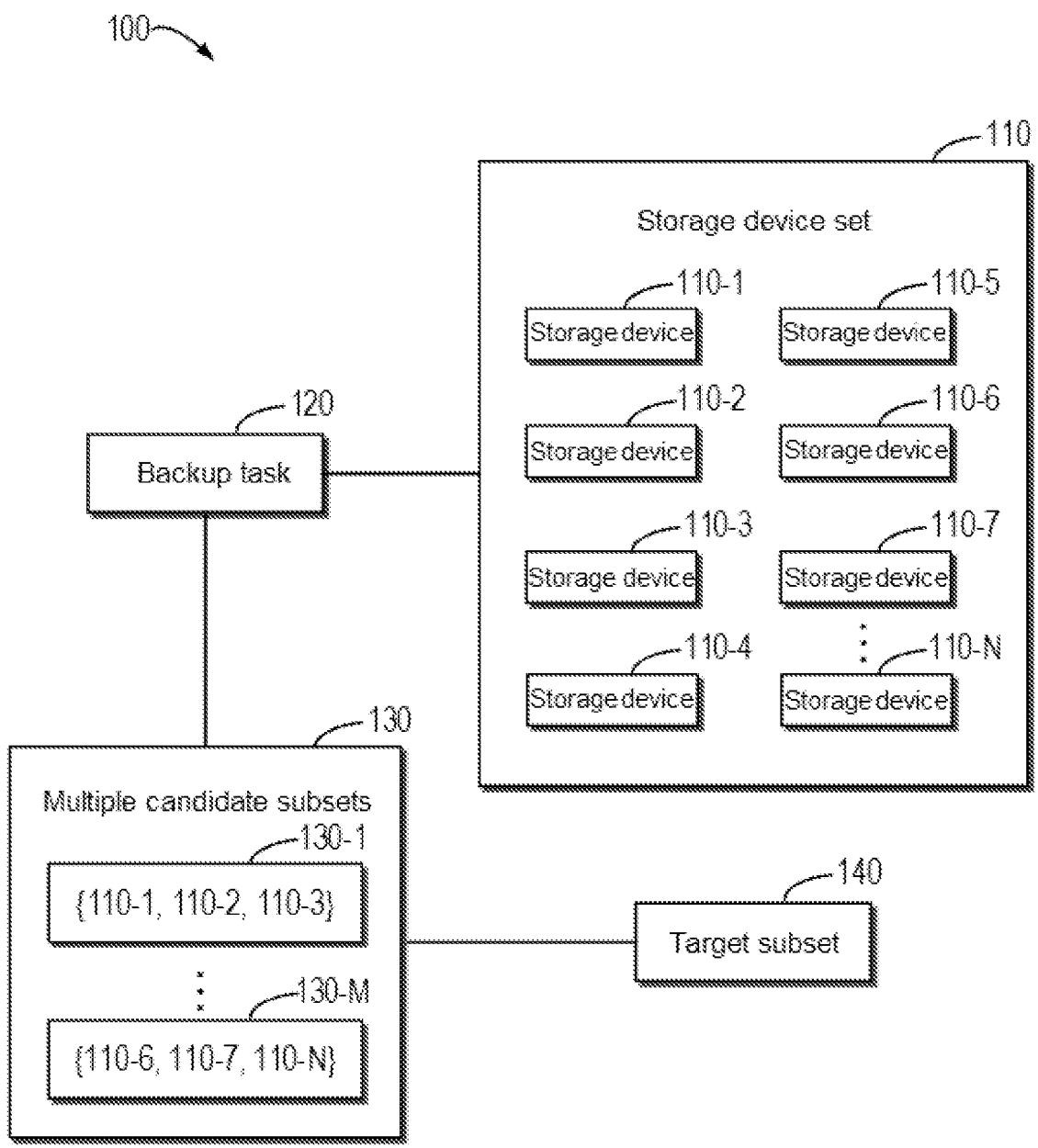
FIG. 1 schematically shows a block diagram of an application environment in which an example implementation of the present disclosure may be implemented.

At present, a concept of distributed storage system has been proposed, and hundreds or more storage devices may be included in a distributed storage system. For example, these storage devices may be distributed in various geographic locations around the world. First, an application environment of an example implementation of the present disclosure will be described with reference to FIG. 1. FIG. 1 schematically shows a block diagram of an example application environment in which an example implementation of the present disclosure may be implemented; FIG. 1 schematically shows block diagram 100 of an example application environment in which an example implementation of the present disclosure may be implemented. The storage system shown in FIG. 1 may include storage device set 110, which may include N storage devices, such as storage devices 110-1, 110-2, 110-3, 110-4, 110-5, 110-6, 110-7, . . . , and 110-N shown in FIG. 1.

Backup task 120 can specify the number of backup copies, for example, it may specify that 3 backup copies are required. At this moment, 3 storage devices need to be selected from a large number of storage devices as backup destinations. It will be understood that there may be multiple candidate subsets 130, and each candidate subset includes 3 storage devices. For example, candidate subset 130-1 may include storage devices 110-1, 110-2, and 110-3, . . . , and candidate subset 130-M may include storage devices 110-6, 110-7, and 110-N. Here, M and N are positive integers. At this moment, target subset 140 may be selected from multiple candidate subsets 130, so as to be used as the destination of backup task 120.

At present, it has been proposed to select a storage device subset that can be used as a backup destination based on states of multiple optional storage devices in storage device set 110. For example, scores for various combinations of storage device subsets (for example, based on permutations and combinations) can be determined. However, when there are a large number (for example, tens or more) of storage devices, there will be tens of thousands or even hundreds of thousands of combinations. Assuming that there are N storage devices and X copies are expected to be stored, there can be $C_N^X$ combinations. For example, if N=1000 and X=3, the number of combinations is $$\frac{1000 \times 999 \times 998}{3 \times 2 \times 1} = 166167000.$$

At this moment, when selecting a backup destination, a huge amount of calculation will be involved and thus the processing efficiency will be low.

In view of the foregoing problems and other potential problems in conventional solutions, an implementation of the present disclosure proposes a technical solution for determining a backup destination for a backup task from a storage device set. In the implementation of the present disclosure, a unique subset code can be set for each candidate subset, and a new subset code can be generated through code transformation. Then, the candidate subset represented by the new subset code can be used as a candidate for the backup destination. Hereinafter, an overview of an example implementation according to the present disclosure will be described with reference to FIG. 2.

Figure 2:
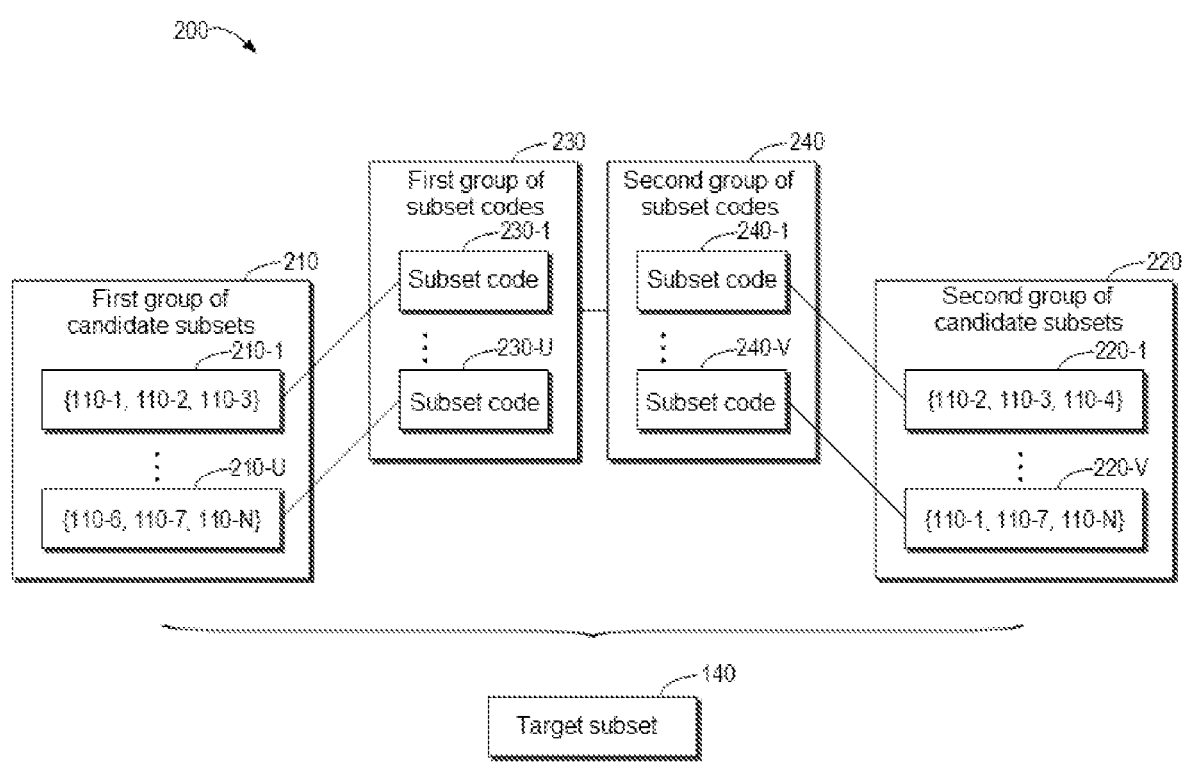
FIG. 2 schematically shows a block diagram of a process for determining a backup destination according to an example implementation of the present disclosure.

FIG. 2 schematically shows block diagram 200 of a process for determining a backup destination according to an example implementation of the present disclosure. As shown in FIG. 2, first group of candidate subsets 210 can be selected from storage device set 110. For example, first group of candidate subsets 210 may include U candidate subsets (U is a positive integer and its value may be much smaller than the number of combinations $C_N^X$). A subset code is set for each candidate subset to form first group of subset codes 230. For example, a code of candidate subset 210-1 is subset code 230-1, a code of candidate subset 210-U is subset code 230-U, and so on.

Second group of subset codes 240 can be generated based on first group of subset codes 230. It should be understood that first group of subset codes 230 and second group of subset codes 240 may have the same or different numbers of subset codes. For example, second group of subset codes 240 may include subset codes 240-1, . . . , and 204-V. Then, second group of candidate subsets 220 can be generated based on second group of subset codes 240, and target subset 140 can be selected from the candidate subsets 220-1, . . . , and 220-V.

With the example implementation of the present disclosure, it is not necessary to traverse each combination one by one. Instead, more candidate subsets can be obtained based on initial first group of candidate subsets 210. In this way, the amount of calculation for selecting the target subset can be greatly reduced. Although the target subset obtained in this way may not be globally optimal, this technical solution can obtain a locally optimal target subset within a limited time and computational overhead. In this way, the speed of selecting a backup destination can be increased, and a balance can be achieved between the processing speed and the overall performance of the storage system.

Figure 3:
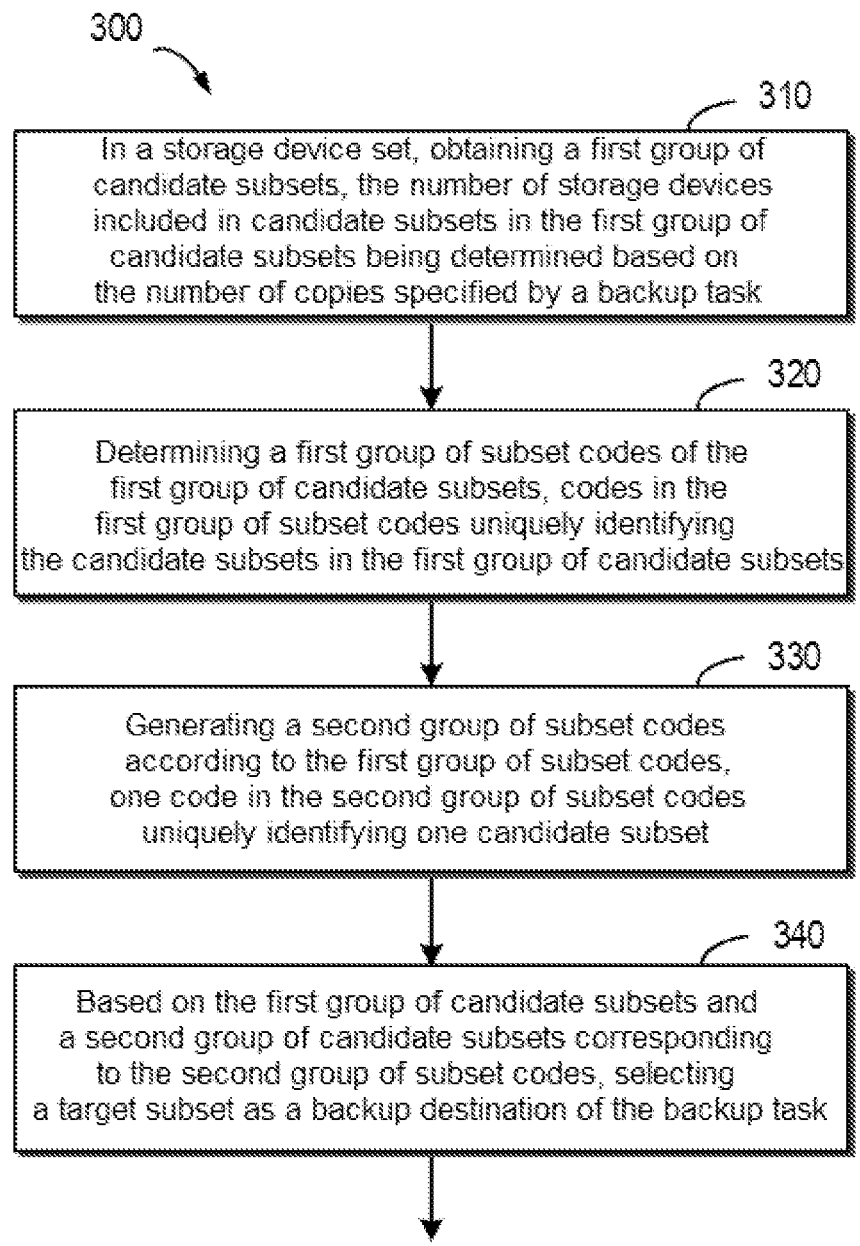
FIG. 3 schematically shows a flowchart of a method for determining a backup destination according to an example implementation of the present disclosure.

Hereinafter, more details of an example implementation according to the present disclosure will be described with reference to FIG. 3. FIG. 3 schematically shows a flowchart of method 300 for determining a backup destination according to an example implementation of the present disclosure.

At block 310, in storage device set 110, first group of candidate subsets 210 is obtained, and the number of storage devices included in candidate subsets in first group of candidate subsets 210 is determined based on the number of copies specified by backup task 120. Each candidate subset can be used as a backup destination.

According to an example implementation of the present disclosure, first group of candidate subsets 210 may be selected from multiple candidate subsets. For example, first group of candidate subsets 210 may be selected from multiple candidate subsets of the storage device set based on a predetermined performance requirement for the backup destination. In this way, candidate subsets that do not meet the predetermined performance requirement can be excluded from the multiple candidate subsets, thereby ensuring that each candidate subset in first group of candidate subsets 210 used as an initial seed meets the performance requirement.

The number of copies specified by backup task 120 can be determined. According to an example implementation of the present disclosure, the number of copies may be entered by a user of the storage system. For example, the user may specify the number of copies in a service level agreement (SLA). Hereinafter, for convenience of description, only the number of copies being 3 will be used as an example for description. It should be understood that the implementations of the present disclosure are applicable to the situation with any other number of copies.

According to an example implementation of the present disclosure, the number of storage devices in each initial candidate subset in multiple candidate subsets may be equal to the number of copies, that is, each storage device may store one data copy. At this moment, there will be $C_N^3$ candidate subsets. When the number N is large, there will be a large number of candidate subsets. At this moment, it can be from only $C_N^3$ candidate subsets. According to an example implementation of the present disclosure, a predetermined number of candidate subsets can be selected, for example, 500 (or another number) candidate subsets may be randomly selected. At this moment, first group of candidate subsets 210 will include 500 candidate subsets. According to an example implementation of the present disclosure, it may specify that first group of candidate subset 210 should include all N storage devices.

Then, first group of candidate subsets 210 may be filtered based on the predetermined performance requirement. For example, the predetermined performance requirement may be set based on a distance between storage devices. The predetermined performance requirement may include a distance between any two storage devices in each candidate subset in first group of candidate subsets 210 being greater than a threshold distance. Assuming that a given candidate subset in first group of candidate subsets 210 includes 3 storage devices, and a distance between two devices of them is less than the threshold distance. The candidate subset may be deleted from first group of candidate subset 210.

Further, if it is determined that a distance between two storage devices in the storage device set is less than the threshold distance, the candidate subset including the two storage devices can be removed from first group of candidate subsets 210. It will be understood that the threshold distance can ensure that the storage devices in each candidate subset have different physical environments, and thereby reducing the possibility that different storage devices have failures (for example, power outage, flood, mechanical shock, and the like) at the same time. It will be understood that specific numerical values of the threshold distance listed here are only illustrative and are not intended to limit the scope of the present disclosure in any way. In other implementations, the threshold distance may be set to any value according to specific technical environments and performance requirements.

According to an example implementation of the present disclosure, the predetermined performance requirement may be set based on available resources in the storage devices. Specifically, the predetermined performance requirement may include: the amount of available resources of any storage device in the first group of candidate subsets is greater than a threshold amount of resources. In this way, it can be ensured that any candidate subset can complete the data backup task. For example, the amount of available resources here may include the amount of computing resources, the amount of memory resources, storage capacities, network bandwidths, etc. of the storage devices. Therefore, if it is determined that the amount of available resources of a certain (or some) storage device(s) is less than the threshold amount of resources, an initial candidate subset including such storage devices can be excluded from the first group of candidate subsets. According to an example implementation of the present disclosure, the threshold amount of resources may be set based on the amount of resources required for the backup task. In other implementations, the threshold amount of resources may also be predetermined according to specific technical environments and performance requirements.

According to an example implementation of the present disclosure, first group of candidate subsets 210 may also be determined based on global equalization of multiple candidate subsets. Here, the global equalization indicates usage equalization of the storage device set in the case where storage devices in the candidate subset are used for the backup task. It will be understood that the "usage equalization" may refer to the equalization degree of "usage" of multiple storage devices in any aspect. For example, the "usage equalization" may refer to the "usage equalization" of available storage capacities of multiple storage devices, the "usage equalization" of input network bandwidths of multiple storage devices, the "usage equalization" of processing resources of multiple storage devices, the "usage equalization" of memory resources of multiple storage devices, and so on.

Figure 4:
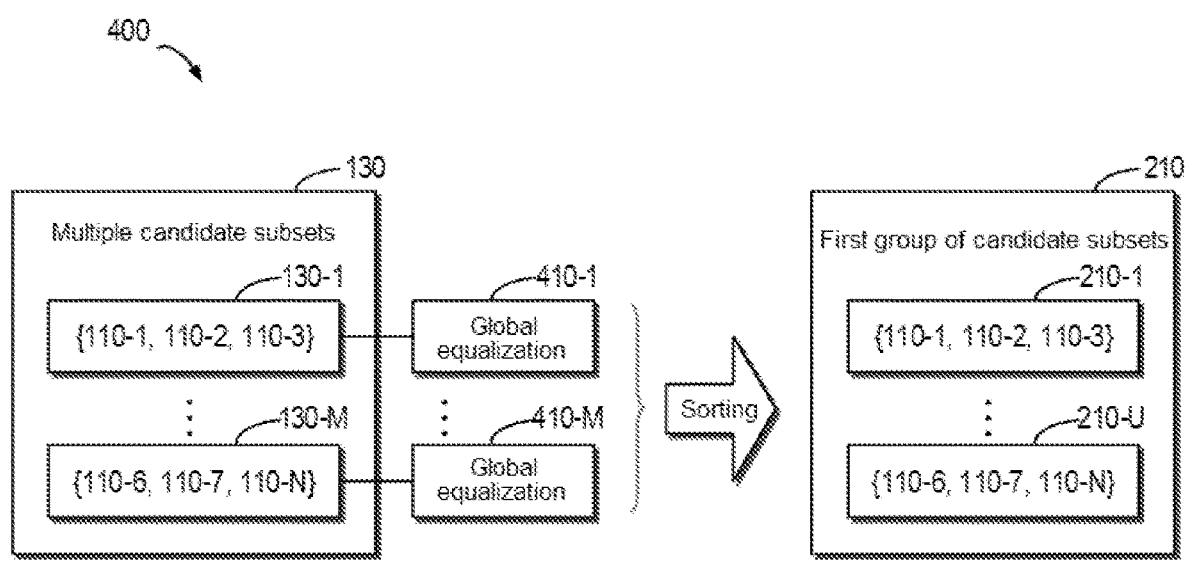
FIG. 4 schematically shows a block diagram of a process for obtaining a first group of candidate subsets according to an example implementation of the present disclosure.

The global equalization of each candidate subset in multiple candidate subsets 130 may be determined respectively, and then first group of candidate subsets 210 may be determined based on the global equalization. Hereinafter, more details will be described with reference to FIG. 4. FIG. 4 schematically shows block diagram 400 of a process for obtaining a first group of candidate subsets according to an example implementation of the present disclosure. As shown in FIG. 4, global equalization 410-1 of candidate subset 130-1 can be determined, . . . , global equalization 410-M of candidate subset 130-M can be determined, and so on. Global equalizations 410-1 to 410-M can be sorted, and a predetermined number (or a predetermined percentage) of candidate subsets may be selected to create first group of candidate subsets 210.

According to an example implementation of the present disclosure, the global equalization may be determined in various ways. According to an example implementation of the present disclosure, the global equalization of the candidate subset can be determined based on usage metrics of each storage device in the candidate subset and time required to transfer backup data to each storage device in the candidate subset.

According to an example implementation of the present disclosure, it is expected that the usage rate of multiple storage devices will increase uniformly, but it is not desirable that a certain storage device is used up prematurely. Therefore, the usage metrics can be used to measure the time when the storage device is used up. For example, it is possible to determine when the storage device is used up based on a remaining storage capacity in the storage device, a size of source data to be backed up, and a daily growth rate of the source data. For example, the time when an i-th storage device is used up can be determined based on the following Formula 1 and Formula 2:

$$VE_i = \sum_{s=1}^{n} \frac{SDS_s * DDI_i}{DR} \qquad \text{Formula 1}$$

where $VE_i$ represents the daily data growth of the i-th storage device, i is a positive integer and i≤the number of storage devices N, n represents the amount of source data with backup, $SDS_s$ represents S-th source data, $DDI_i$ represents the daily data growth of the i-th storage device (for example, expressed as a percentage), and DR represents the data repetition rate.

$$ETFR_i = \frac{VE_i}{RC_i} \qquad \text{Formula 2}$$

where $ETFR_i$ represents the predicted use-up time of the i-th storage device, where $VE_i$ represents the daily data growth of the i-th storage device, and $RC_i$ represents the available storage space on the i-th storage device.

Further, the standard deviation of the use-up time of each storage device can be determined based on the following Formula 3:

$$\sigma 1 = \sqrt{\frac{\sum_{i=1}^{N}(ETFR_i - \overline{ETFR})^2}{N}} \qquad \text{Formula 3}$$

where σ1=represents the standard deviation of the use-up time, N represents the number of storage devices, $ETFR_i$ represents the predicted use-up time of the i-th storage device, and $\overline{ETFR}$ represents an average value of use-up times of all storage devices. It will be understood that Formulas 1 to 3 are only specific examples for determining a component of use-up time in the global equalization. According to an example implementation of the present disclosure, the component may be determined based on other formulas.

Hereinafter, more information about determining the transmission time will be introduced. According to an example implementation of the present disclosure, the time required to transfer source data to a certain storage device can be determined based on the bandwidth of each storage device. For example, the time to transfer the source data to the i-th storage device can be determined based on the following Formula 4.

$$ETC_i = \frac{VE_i}{NB_i} \qquad \text{Formula 4}$$

where $ETC_i$ represents the time to transfer source data to the i-th storage device, $VE_i$ represents the daily data growth of the i-th storage device, and $NB_i$ represents the bandwidth of the i-th storage device.

The standard deviation of the transmission time of each storage device can be further determined based on Formula 5:

$$\sigma 2 = \sqrt{\frac{\sum_{i=1}^{N}(ETC_i - \overline{ETC})^2}{N}} \qquad \text{Formula 5}$$

where σ2=represents the standard deviation of the relevant transmission time, N represents the number of storage devices, $ETC_i$ represents the predicted transmission time of the i-th storage device, and $\overline{ETC}$ represents an average value of transmission times of all storage devices. It will be understood that Formulas 4 to 5 are only specific examples for determining a component of transmission time in the global equalization. According to an example implementation of the present disclosure, the component may be determined based on other formulas.

According to an example implementation of the present disclosure, a global equalization function GE associated with each candidate subset may be determined based on the following Formula 6:

$$GE = \sigma 1 * v1 + \sigma 2 * v2 + v3 \qquad \text{Formula 6}$$

where v1 and v2 distributions represent custom weights, σ1 and σ2 are components determined according to the formula described above, and v3 represents custom offset value. It will be understood that Formula 6 here is only illustrative. According to an example implementation of the present disclosure, the global equalization function GE may be determined by using other formulas. For example, the global equalization function GE may be determined based on a product of the σ1 and σ2.

According to an example implementation of the present disclosure, a corresponding global equalization function GE may be determined for each candidate subset in first group of candidate subsets 210. Assuming that the storage device set includes N storage devices, and state parameters of each storage device are shown in Table 1 below:

TABLE 1

| | State Parameters of Storage Device | | | |
|---|---|---|---|---|
| | $VE_t$ (GB/day) | $RC_t$ (GB) | $NB_t$ (GB/s) | $VE_t$ (GB/s) |
| 1st storage device | 150 | 18,000 | 0.1 | 0.001736 |
| 2nd storage device | 80 | 16,000 | 0.1 | 0.000926 |
| ... | ... | ... | ... | ... |
| N-th storage device | 90 | 15,000 | 0.1 | 0.001042 |

It is assumed that 3 copies need to be generated and 6 GB of data is added every day, first group of candidate subsets 210 includes U candidate subsets, and the global equalization GE of each candidate subset in first group of candidate subsets 210 can be as shown in Table 2 below.

TABLE 2

| Global Equalization of Candidate Subset | |
| --- | --- |
| Candidate Subset | Global Equalization |
| 1st candidate subset | 10.70986 |
| ... | |
| U-th candidate subset | 10.36655 |

The global equalizations in Table 2 can be sorted, and candidate subsets with larger global equalizations can be filtered out from first group of candidate subsets 210. In other words, a candidate subset with smaller global equalization may be preferentially selected to generate first group of candidate subset 210.

According to an example implementation of the present disclosure, a threshold of the global equalization may be specified, and candidate subsets higher than the threshold can be filtered out from first group of candidate subsets 210. According to an example implementation of the present disclosure, the threshold may be set based on historical experience. According to an example implementation of the present disclosure, the threshold may be set based on the current state of each storage device.

It will be understood that the global equalization here represents a difference between the usage of each storage device in the storage device set after a certain candidate subset is selected as the backup destination. The smaller the value of the global equalization, the more conducive the selection of the candidate subset is to the use balance among all storage devices. By using the example implementation of the present disclosure, it is possible to select as far as possible candidate subsets that contribute to the use balance among all storage devices to generate first group of candidate subsets 210. Further, first group of candidate subsets 210 may be used as a "seed" to generate more candidate subsets, which in turn helps to find a locally optimal candidate subset.

Figure 5:
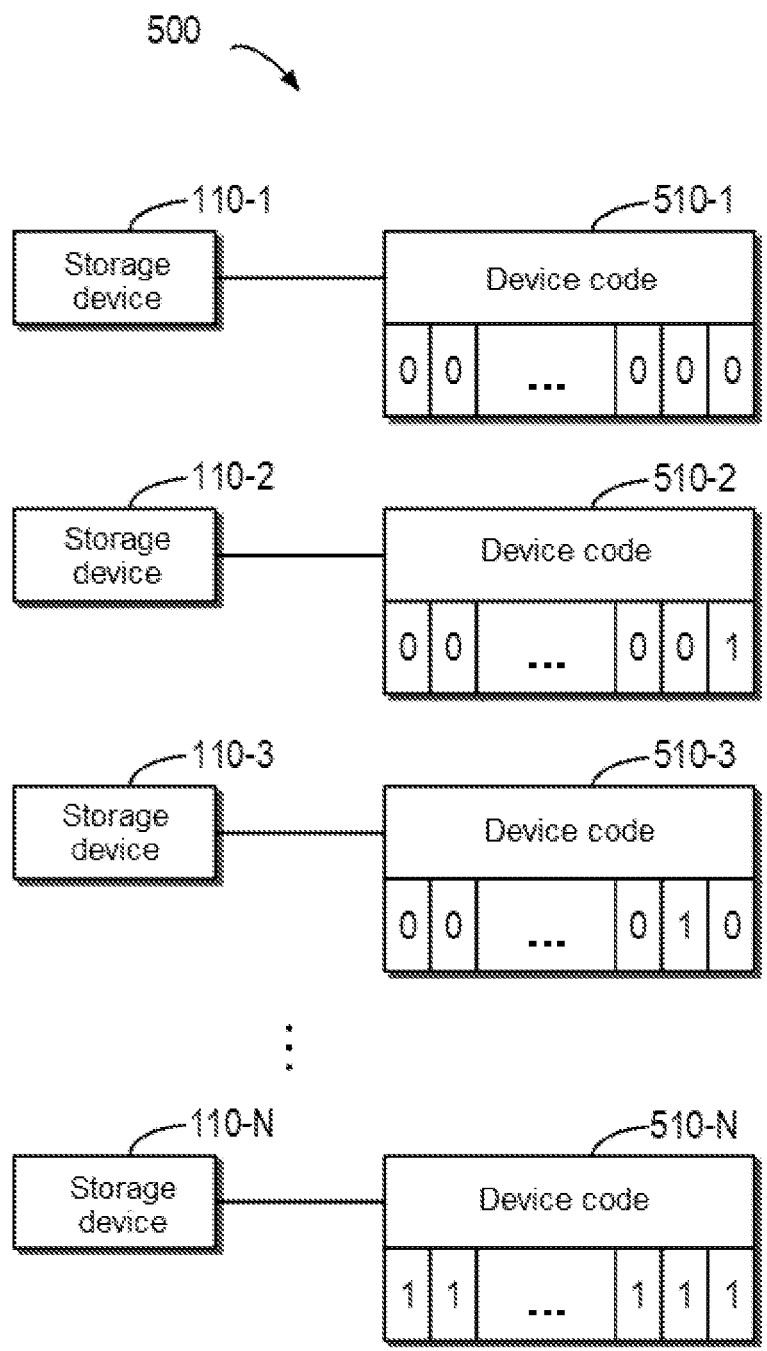
FIG. 5 schematically shows a block diagram of a process for determining device codes according to an example implementation of the present disclosure.

The specific steps for determining first group of candidate subsets 210 have been described above. Hereinafter, the flow will return to FIG. 3 to continue describing how to determine subset codes of the candidate subset. At block 320 of FIG. 3, first group of subset codes 230 of first group of candidate subsets 210 are determined, and each subset code in first group of subset codes 230 can uniquely identify one candidate subset in first group of candidate subsets 210. According to an example implementation of the present disclosure, the subset codes of the candidate subsets may be determined based on device codes of multiple storage devices included in the candidate subset. First, specific details of determining the device code are described with reference to FIG. 5. FIG. 5 schematically shows block diagram 500 of a process for determining device codes according to an example implementation of the present disclosure.

The number of devices in multiple storage devices in storage device set 110 may be determined first. As shown in FIG. 5, at this moment, the number of devices is N, and then the device code of each storage device may be determined based on the number of devices N. For example, storage device 110-1 may be represented by device code 510-1, storage device 110-2 may be represented by device code 510-2, storage device 110-3 may be represented by device code 510-3, . . . , and storage device 110-N may be represented by device code 510-N.

For a given storage device in multiple storage devices, a length of the device code may be determined based on the number of devices N. According to an example implementation of the present disclosure, the device code of the storage device may be represented in binary. At this moment, the length length=$\lceil \log_2 N \rceil$ of the device code may be determined based on the following formula: Assuming N=1024, the device code may be represented by a 10-bit length. As shown in FIG. 5, 1st storage device 110-1 may be represented by device code 510-1 (i.e., 00 . . . 000), 2nd storage device 110-2 may be represented by device code 510-2 (i.e., 00 . . . 001), 3rd storage device 110-3 may be represented by device code 510-3 (i.e., 00 . . . 010), . . . , and N-th storage device 110-N may be represented by device code 510-N (i.e., 11 . . . 111).

It will be understood that the above description only schematically shows a specific example of representing the device code in binary. According to an example implementation of the present disclosure, the device code may also be represented in other ways. For example, the device code may be represented in quaternary, octal, or hexadecimal.

Figure 6:
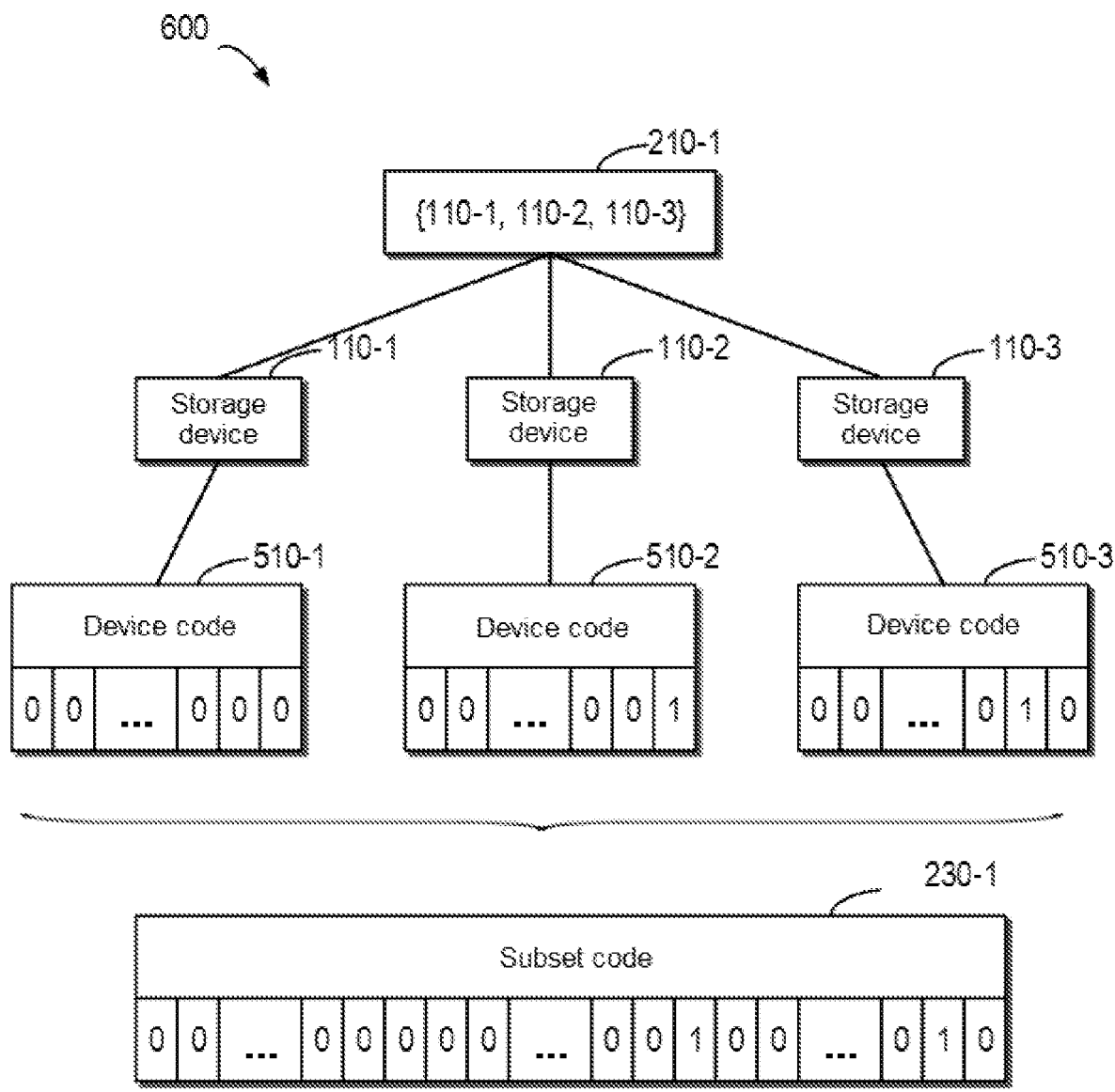
FIG. 6 schematically shows a block diagram of a process for determining subset codes according to an example implementation of the present disclosure.

Further, codes of a given candidate subset may be determined based on the device code of each storage device in the given candidate subset. Hereinafter, more details will be described in detail with reference to FIG. 6. FIG. 6 schematically shows block diagram 600 of a process for determining subset codes according to an example implementation of the present disclosure. Candidate subset 210-1 includes 3 storage devices: storage device 110-1, storage device 110-2, and storage device 110-3. Subset code 230-1 of candidate subset 210-1 may be determined based on the device codes of the three storage devices. As shown in FIG. 6, device code 510-1, device code 510-2, and device code 510-N may be combined to generate subset code 230-1. Since a length of each device code is 10 bits, the length of the subset code at this moment will be 10×3=30 bits. When other ways are used, the device code and the subset code may have different lengths.

The specific process for determining the subset codes has been described above. A similar operation can be performed for each candidate subset in first group of candidate subsets 210, so as to determine the corresponding subset code for each candidate subset. Hereinafter, the flow will return to FIG. 3 to describe more details about generating second group of subset codes 240. At block 330, second group of subset codes 240 are generated according to first group of subset codes 230, and each code in second group of subset codes 240 uniquely identifies a candidate subset. According to an example implementation of the present disclosure, a part of first group of subset codes 210 may be swapped to generate the second group of subset codes.

Figure 7A:
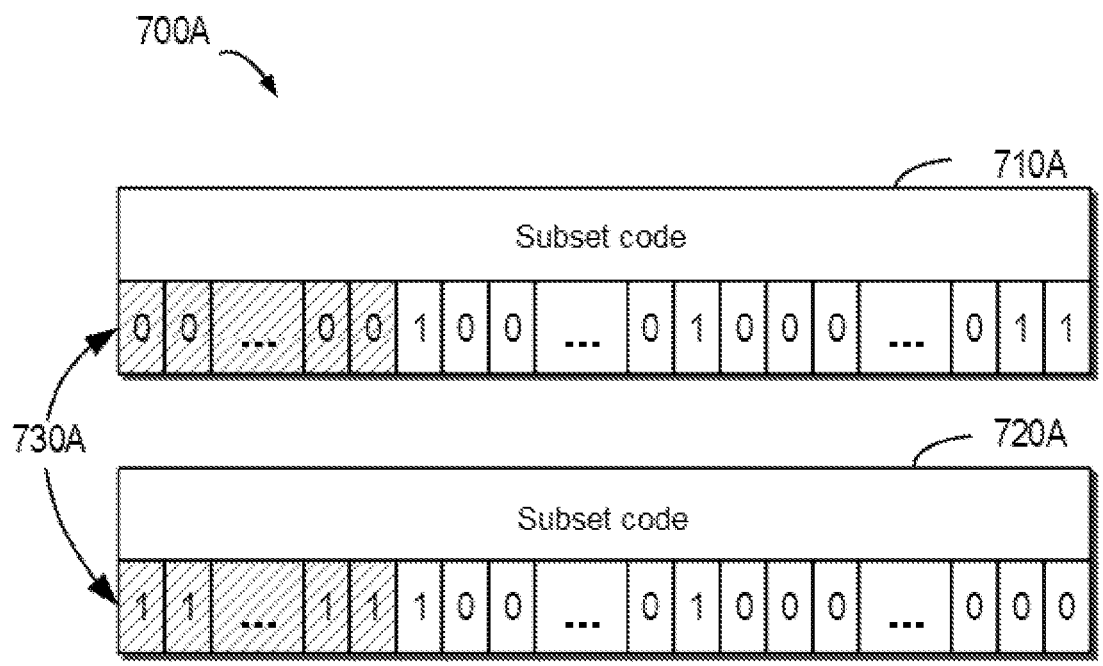
FIGS. 7A and 7B respectively schematically show a block diagram of a process for generating a second group of subset codes based on a swap operation according to an example implementation of the present disclosure.
Figure 7B:
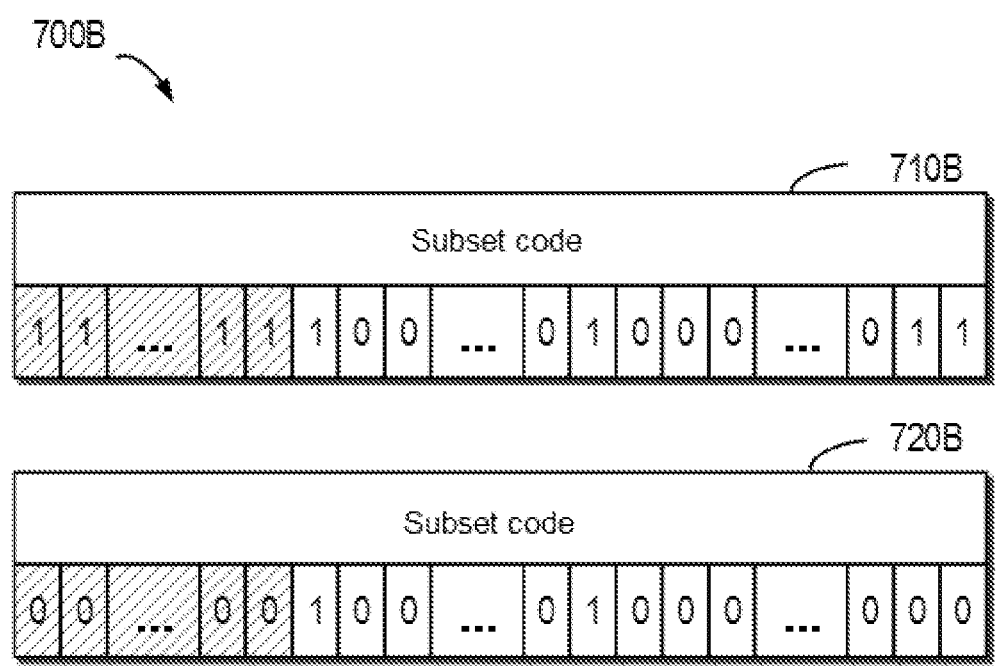

Hereinafter, only two subset codes in first group of candidate subset 210 will be used as an example to describe more details about the swap operation. FIGS. 7A and 7B respectively schematically show a block diagram of a process for generating a second group of subset codes based on a swap operation according to an example implementation of the present disclosure. Specifically, FIG. 7A shows block diagram 700A of the subset code before the swap. Subset codes 710A and 720A are codes of two candidate subsets in first group of candidate subsets 210.

As shown in FIG. 7A, each code in first group of subset codes 230 may be divided into multiple segments according to a predetermined length. For simplicity, FIG. 7A only schematically shows an example of dividing a subset code into two segments. Specifically, the shaded part shows one segment, and the blank part shows the other segment. Bits shown in the shaded part in subset codes 710A and 720A may be swapped. As indicated by arrow 730A, each bit "00 . . . 00" in subset code 710A will be swapped with each bit "11 . . . 11" in subset code 720A.

FIG. 7B shows block diagram 700B of the swapped subset codes, where subset codes 710B and 720B are the swapped subset codes. As shown in FIG. 7B, at this moment, each bit of the shaded part in subset code 710B has been set to "11 . . . 11," and each bit of the shaded part in subset code 710B has been set to "00 . . . 00." With an example implementation of the present disclosure, more subset codes (i.e., second group of subset codes 240) may be generated based on original first group of subset codes 230. In this way, it can be ensured that the generated subset code has higher diversity.

It will be understood that although FIGS. 7A and 7B only show an example of dividing the subset code into two segments, according to an example implementation of the present disclosure, the subset code may be divided into more segments. For example, the subset code may be divided into 4 segments, and each bit of the first segment and each bit of the third segment in two subset codes may be swapped. For another example, each bit of the first segment and each bit of the fourth segment in two subset codes may be swapped.

According to an example implementation of the present disclosure, the length of each segment may be specified, and the segments can have the same or different lengths, for example, the length of first segment may be 4, the length of second segment may be 8, and the length of third segment may be 18. For another example, the lengths of the three segments may all be 10.

It will be understood that although the specific way of swapping corresponding segments of two subset codes is described above, according to an example implementation of the present disclosure, it is also possible to swap between corresponding segments of multiple subset codes. For example, first group of candidate subsets 210 may be divided into multiple groups, and assuming that each group includes K candidate subsets, corresponding segments in the K subset codes can be swapped cyclically. For example, in one group, the first segment in the first subset code may be replaced with the first segment in the second subset code, the first segment in the second subset code may be replaced with the first segment in the third subset code, and so on.

According to an example implementation of the present disclosure, swap may be performed between different segments of multiple subset codes. Assuming that the length of each segment is the same, different segments in each subset code can be directly swapped. Assuming that the length of each segment is not the same, a shorter length may be obtained by an interception operation, and a longer length may be obtained by a filling operation. Specifically, assuming that the lengths of the first segment and the second segment are 4 and 6, respectively, the first segment (including 4 bits) of subset code A can be stored in a temporary storage area during the swap process, and the first 4 bits in the second segment (including 6 bits) in subset code B replace the first segment of subset code A. Then, the second segment in subset code B may be replaced with a 4-bit value in the temporary storage area and a randomly generated 2-bit value.

It will be understood that the above description only schematically shows a process of generating a new subset code based on a swap operation. According to an example implementation of the present disclosure, it is possible to continuously generate new subset codes based on the existing subset codes in multiple rounds. In this way, more subset codes can be obtained, and further more candidate subsets can be obtained. By using the example implementation of the present disclosure, abundant candidate subsets can ensure that as many situations as possible are covered, and in this way, it can be ensured that a locally optimal candidate subset is generated in a larger range.

According to an example implementation of the present disclosure, at least one subset code may be selected from first group of subset codes 230, and then at least a part of the at least one subset code can be updated to form at least one updated subset code. Specifically, a predetermined number (or proportion) of subset codes may be selected from first group of subset codes 230, and one or some digits of the selected subset codes may be changed. In this manner, second group of subset codes 240 can be determined.

Figure 8:
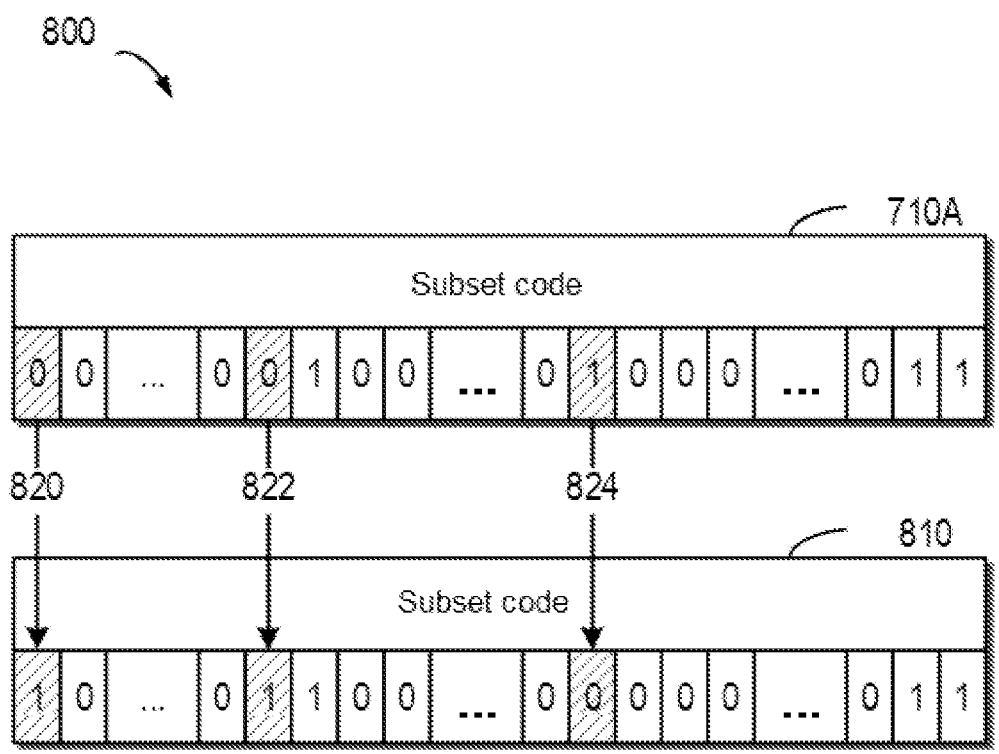
FIG. 8 schematically shows a block diagram of a process for generating a second group of subset codes based on a flipping operation according to an example implementation of the present disclosure.

According to an example implementation of the present disclosure, at least a part of digits in the code can be changed. Specifically, the positions and number of bits to be modified may be specified in advance. For example, 3 bits may be specified to be changed, and the 1st, 10th, and 20th bits may be specified to be changed. When the subset code is represented in binary, the specified digits may be flipped. Hereinafter, more details of a modification operation are described with reference to FIG. 8. FIG. 8 schematically shows block diagram 800 of a process for generating a second group of subset codes based on a flipping operation according to an example implementation of the present disclosure. As shown in FIG. 8, 3 shaded bits in subset code 710A can be flipped. As shown by arrow 820, "0" can be flipped to "1"; as shown by arrow 822, "0" can be flipped to "1"; and as shown by arrow 824, "1" can be flipped to "0."

It will be understood that FIG. 8 above only schematically shows the specific details of the modification operation of the subset code represented in binary. When the subset code is represented in other ways, the specified bits may be modified based on other mathematical operations. For example, the value of a specified bit may be increased or decreased by one, or subjected to other mathematical operations. It will be understood that the above description only schematically shows a process for generating new subset codes based on the modification operation. According to an example implementation of the present disclosure, it is possible to continuously generate new subset codes based on the existing subset codes in multiple rounds. In this way, more subset codes can be obtained, and further more candidate subsets can be obtained.

According to an example implementation of the present disclosure, the above-described swap operation and modification operation may be performed in one or more rounds, so as to generate more subset codes. In this way, more second group of subset codes 240 can be generated from original first group of subset codes 230 in a simple and effective manner. At this moment, second group of subset codes 240 will include more possible combinations, and thereby enriching scenes covered by candidate subsets from which combinations of target subsets are selected.

Figure 9:
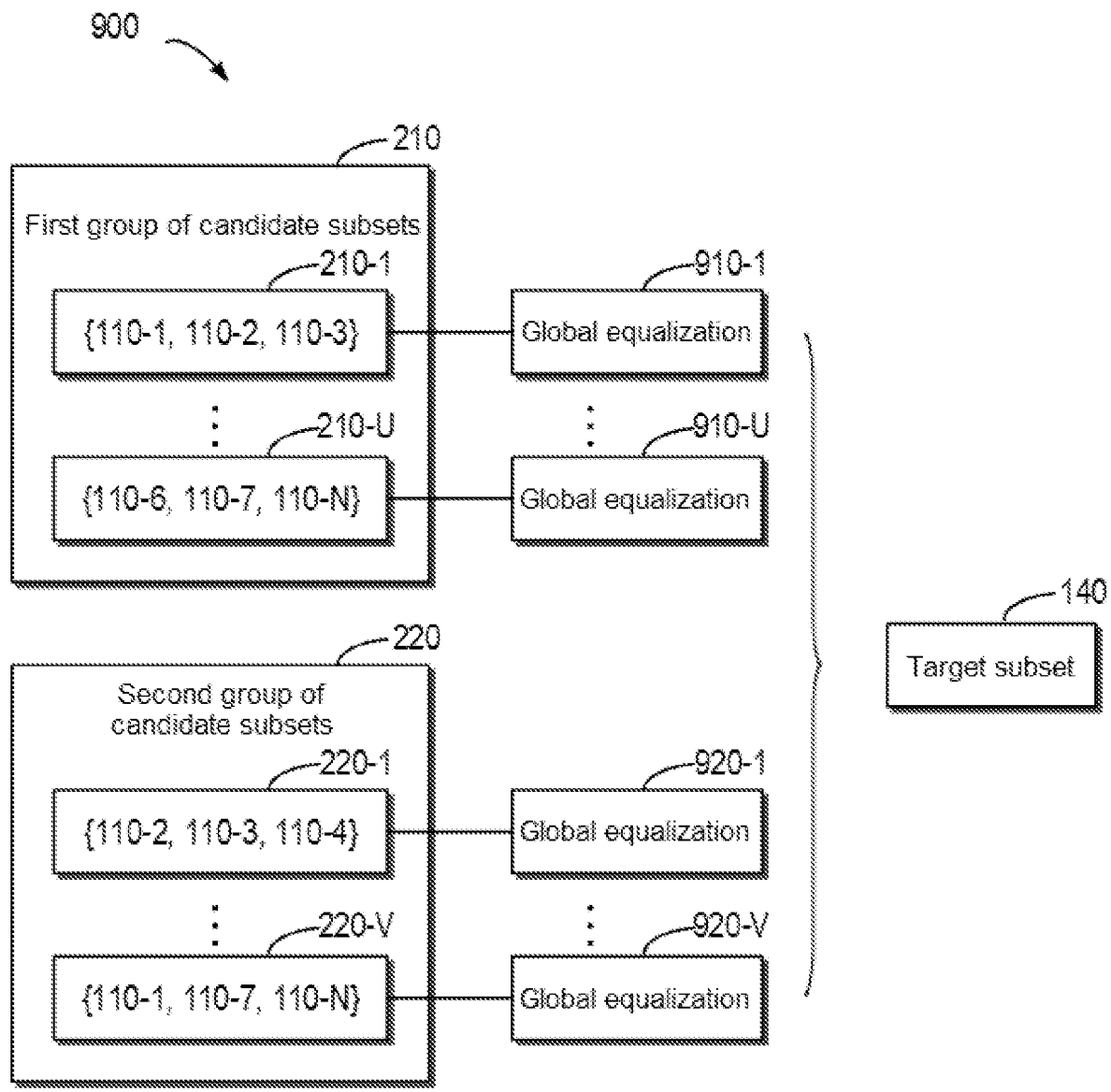
FIG. 9 schematically shows a block diagram of a process for selecting a target subset based on global equalization according to an example implementation of the present disclosure.

The flow returns to FIG. 3 to continue describing more details about selecting target subset 140. At block 340 of FIG. 3, based on first group of candidate subsets 210 and second group of candidate subsets 220 corresponding to second group of subset codes 240, target subset 140 is selected as the backup destination of backup task 140. Hereinafter, more details will be shown with reference to FIG. 9. FIG. 9 schematically shows block diagram 900 of a process for selecting a target subset based on global equalization according to an example implementation of the present disclosure.

As shown in FIG. 9, the global equalization of each candidate subset in first group of candidate subsets 210 and second group of candidate subsets 220 can be determined, and in first group of candidate subsets 210 and second group of candidate subsets 220, the target subset is determined based on the global equalization of each candidate subset. Then, target subset 140 is determined based on global equalization 910-1 of candidate subset 210-1, . . . , global equalization 910-U of candidate subset 210-U, global equalization 920-1 of candidate subset 220-1, . . . , and global equalization 920-V of candidate subset 220-V.

Target subset 140 may be determined based on a variety of ways. For example, a threshold equalization may be set, and if the global equalization of a certain candidate subset is higher than the threshold equalization, the candidate subset is identified as the target subset. In this way, multiple target subsets can be determined so that a user can select a desired target subset therefrom. For another example, all global equalizations may be sorted, so as to select target subset 140 with the optimal local equalization.

According to an example implementation of the present disclosure, data to be backed up can be transferred to each storage device in target subset 140, so as to complete backup task 120. Assuming that backup task 120 specifies to back up source data to 3 storage devices, and target subset 140 includes storage devices 110-1, 110-2, and 110-3, the source data can be backed up to storage devices 110-1, 110-2, and 110-3, respectively. At this moment, storage devices 110-1, 110-2, and 110-3 will each include a copy of the source data.

By using the example implementation of the present disclosure, through setting a globally unique subset code for each candidate subset, more subset codes can be generated based on the swap operations and modification operations of codes, thereby determining more candidate subsets. In this way, more candidate subsets including various combinations can be obtained based on an initial candidate subset, and further a locally optimal candidate subset can be selected from more candidate subsets.

The method for performing the example implementation according to the present disclosure has been described above with reference to FIGS. 2 to 9. According to an example implementation of the present disclosure, an apparatus for selecting a backup destination for a backup task is provided. The apparatus includes: an obtaining module configured to obtain a first group of candidate subsets in a storage device set, the number of storage devices included in the candidate subsets in the first group of candidate subsets being determined based on the number of copies specified by the backup task; a determination module configured to determine a first group of subset codes of the first group of candidate subsets, codes in the first group of subset codes uniquely identifying the candidate subsets in the first group of candidate subsets; a generation module configured to generate a second group of subset codes according to the first group of subset codes, one of the codes in the second group of subset codes uniquely identifying a candidate subset; and a selection module configured to select a target subset as the backup destination of the backup task based on the first group of candidate subsets and a second group of candidate subsets corresponding to the second group of subset codes. According to an example implementation of the present disclosure, the apparatus further includes modules for performing other steps in the method described above.

Figure 10:
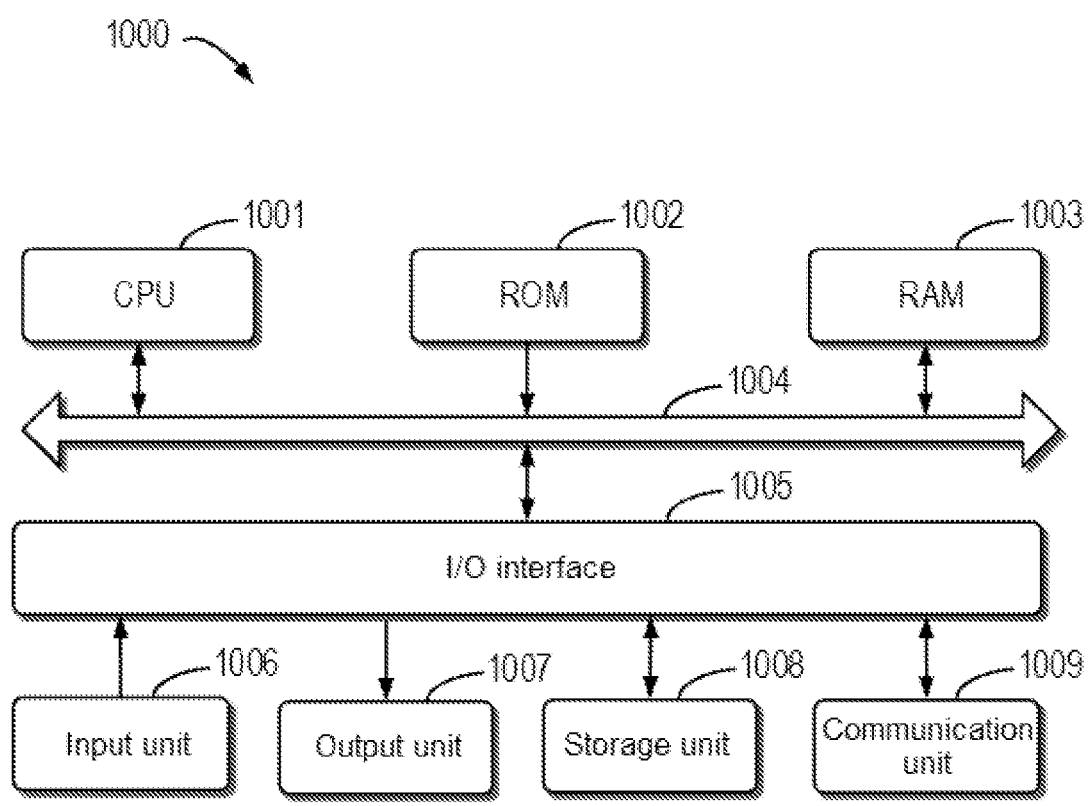
FIG. 10 schematically shows a block diagram of a device that can be configured to implement an implementation of the present disclosure.

FIG. 10 schematically shows a block diagram of device 1000 that can be configured to implement an example implementation of the present disclosure. According to an example implementation of the present disclosure, device 1000 may be an electronic device. Example device 1000 includes central processing unit (CPU) 1001, which can execute various appropriate actions and processing according to computer program instructions stored in read-only storage device (ROM) 1002 or computer program instructions loaded from storage unit 1008 to random access storage device (RAM) 1003. Various programs and data required for operations of example device 1000 may also be stored in RAM 1003. CPU 1001, ROM 1002, and RAM 1003 are connected to each other through bus 1004. Input/output (I/O) interface 1005 is also connected to bus 1004.

Multiple components in example device 1000 are connected to I/O interface 1005, including: input unit 1006, such as a keyboard or a mouse; output unit 1007, such as various types of displays or speakers; storage unit 1008, such as a magnetic disk or an optical disk; and communication unit 1009, such as a network card, a modem, or a wireless communication transceiver. Communication unit 1009 allows example device 1000 to exchange information/data with other devices over a computer network such as the Internet and/or various telecommunication networks.

The various processes and processing described above, such as example methods or example processes, may be performed by processing unit 1001. For example, according to an example implementation of the present disclosure, various example methods or example processes may be implemented as a computer software program that is tangibly contained in a machine-readable medium such as storage unit 1008. In an example implementation of the present disclosure, part or all of the computer program may be loaded and/or installed onto example device 1000 via ROM 1002 and/or communication unit 1009. When the computer program is loaded onto RAM 1003 and executed by CPU 1001, one or more steps of the example methods or example processes described above may be performed.

According to an example implementation of the present disclosure, an electronic device is provided, including: at least one processor; and at least one memory storing computer program instructions, the at least one memory and the computer program instructions being configured to cause, with the at least one processor, the electronic device to perform an action of selecting a backup destination for a backup task. The action includes: obtaining a first group of candidate subsets in a storage device set, the number of storage devices included in candidate subsets in the first group of candidate subsets being determined based on the number of copies specified by the backup task; determining a first group of subset codes of the first group of candidate subsets, codes in the first group of subset codes uniquely identifying the candidate subsets in the first group of candidate subsets; generating a second group of subset codes according to the first group of subset codes, codes in the second group of subset codes uniquely identifying candidate subsets; and based on the first group of candidate subsets and a second group of candidate subsets corresponding to the second group of subset codes, selecting a target subset as the backup destination of the backup task.

According to an example implementation of the present disclosure, determining the first group of subset codes of the first group of candidate subsets includes: for a given candidate subset in the first group of candidate subsets, determining the number of devices in multiple storage devices in the storage device set; based on the number of devices, determining device codes of multiple storage devices respectively; and based on the device code of each storage device in a given candidate subset, determining a code of the given candidate subset.

According to an example implementation of the present disclosure, determining the device codes of multiple storage devices respectively includes: for a given storage device in multiple storage devices, determining a length of the device code of the given storage device based on the number of devices; and based on the length, representing the device code of the storage device in binary.

According to an example implementation of the present disclosure, generating the second group of subset codes according to the first group of subset codes includes: swapping a part of the first group of subset codes to generate the second group of subset codes.

According to an example implementation of the present disclosure, swapping the part of the first group of subset codes includes: dividing each subset code in the first group of subset codes into multiple segments according to a predetermined length; and swapping at least one of the multiple segments of each subset code.

According to an example implementation of the present disclosure, generating the second group of subset codes according to the first group of subset codes includes: selecting at least one subset code from the first group of subset codes; updating at least a part of the at least one subset code to form at least one updated subset code; and based on the at least one updated subset code, determining the second group of subset codes.

According to an example implementation of the present disclosure, updating at least a part of the at least one subset code includes: changing at least a part of digits in the at least one subset code.

According to an example implementation of the present disclosure, determining the first group of candidate subsets includes: based on a predetermined performance requirement for the backup destination, selecting the first group of candidate subsets from multiple candidate subsets of the storage device set.

According to an example implementation of the present disclosure, the predetermined performance requirement includes at least any one of the following: a distance between any two storage devices in each candidate subset in the first group of candidate subsets being greater than a threshold distance; and an amount of available resource of any storage device in the first group of candidate subsets being greater than a threshold amount of resources.

According to an example implementation of the present disclosure, determining the first group of candidate subsets includes: respectively determining global equalization of candidate subsets in multiple candidate subsets of the storage device set, the global equalization indicating usage equalization of the storage device set in a case of storage devices in the candidate subset being used for the backup task; and based on the global equalization of the candidate subsets in the multiple candidate subsets, determining the first group of candidate subsets.

According to an example implementation of the present disclosure, determining global equalization of the candidate subset includes: determining the global equalization based on at least any one of the following: usage metrics of each storage device in the candidate subset; and time required to transfer backup data to each storage device in the candidate subset.

According to an example implementation of the present disclosure, selecting the target subset includes: determining the global equalization of each candidate subset in the first group of candidate subsets and the second group of candidate subsets; and in the first group of candidate subsets and the second group of candidate subsets, determining the target subset based on the global equalization of each candidate subset.

According to an example implementation of the present disclosure, determining the target subset includes: for a given candidate subset in the first group of candidate subsets and the second group of candidate subsets, in response to determining that the global equalization of the given candidate subset is higher than the threshold equalization, identifying the given candidate subset as the target subset.

According to an example implementation of the present disclosure, a computer program product is provided. The computer program product is tangibly stored on a non-volatile computer-readable medium and includes machine-executable instructions. The machine-executable instructions, when being executed, cause a machine to perform the method described above.

According to an example implementation of the present disclosure, a computer-readable medium is provided. The medium includes machine-executable instructions. The machine-executable instructions, when being executed, cause a machine to perform the method described above.

As used herein, the term "include" and similar terms thereof should be understood as open-ended inclusion, i.e., "including but not limited to." The term "based on" should be understood as "based at least in part on." The term "one implementation" or "the implementation" should be understood as "at least one implementation." The terms "first," "second," etc. may refer to different or the same objects. Other explicit and implicit definitions may also be included herein.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the implementations of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods may be implemented by using computer-executable instructions and/or by being included in a processor control code, and for example, such code is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowchart can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific implementations, it should be understood that the present disclosure is not limited to the specific implementations disclosed. The present disclosure is intended to cover various modifications and equivalent arrangements included within the spirit and scope of the appended claims.

The invention claimed is:

1. A method for selecting a backup destination for a backup task, comprising:
   in a storage device set, obtaining a first group of candidate subsets, a number of storage devices included in candidate subsets in the first group of candidate subsets being determined based on a number of copies specified by the backup task;
   determining a first group of subset codes of the first group of candidate subsets, codes in the first group of subset codes uniquely identifying the candidate subsets in the first group of candidate subsets;
   generating a second group of subset codes according to the first group of subset codes, one code in the second group of subset codes uniquely identifying one candidate subset; and
   based on the first group of candidate subsets and a second group of candidate subsets corresponding to the second group of subset codes, selecting a target subset as the backup destination of the backup task.

2. The method according to claim 1, wherein determining the first group of subset codes of the first group of candidate subsets comprises: for a given candidate subset in the first group of candidate subsets,
   determining the number of devices in multiple storage devices in the storage device set;
   based on the number of devices, determining device codes of the multiple storage devices respectively; and
   based on the device code of each storage device in the given candidate subset, determining a code of the given candidate subset.

3. The method according to claim 2, wherein determining the device codes of the multiple storage devices respectively comprises: for a given storage device in the multiple storage devices,
   based on the number of devices, determining a length of a device code of the given storage device; and
   based on the length, representing the device code of the storage device in binary.

4. The method according to claim 3, wherein generating the second group of subset codes according to the first group of subset codes comprises: swapping a part of the first group of subset codes to generate the second group of subset codes.

5. The method according to claim 4, wherein swapping the part of the first group of subset codes comprises:
   dividing each subset code in the first group of subset codes into multiple segments according to a predetermined length; and
   swapping at least one of the multiple segments of each of the subset codes.

6. The method according to claim 3, wherein generating the second group of subset codes according to the first group of subset codes comprises:
   selecting at least one subset code from the first group of subset codes;
   updating at least a part of the at least one subset code to form at least one updated subset code; and
   based on the at least one updated subset code, determining the second group of subset codes.

7. The method according to claim 6, wherein updating the at least a part of the at least one subset code comprises: changing at least a part of digits in the at least one subset code.

8. The method according to claim 1, wherein determining the first group of candidate subsets comprises:
   based on a predetermined performance requirement for the backup destination, selecting the first group of candidate subsets from multiple candidate subsets of the storage device set.

9. The method according to claim 8, wherein the predetermined performance requirement comprises at least one of the following:
   a distance between any two storage devices in each candidate subset in the first group of candidate subsets being greater than a threshold distance; and
   an amount of available resources of any storage device in the first group of candidate subsets being greater than a threshold amount of resources.

10. The method according to claim 1, wherein determining the first group of candidate subsets comprises:
    determining global equalization of a candidate subset in multiple candidate subsets of the storage device set respectively, the global equalization indicating usage equalization of the storage device set in a case of storage devices in the candidate subset being used for the backup task; and
    based on the global equalization of the candidate subset in multiple candidate subsets, determining the first group of candidate subsets.

11. The method according to claim 10, wherein determining the global equalization of the candidate subset comprises: determining the global equalization based on at least one of the following:
    usage metrics of each storage device in the candidate subset; and
    time required to transfer backup data to each storage device in the candidate subset.

12. The method according to claim 1, wherein selecting the target subset comprises:
    determining global equalization of each candidate subset in the first group of candidate subsets and the second group of candidate subsets; and
    in the first group of candidate subsets and the second group of candidate subsets, based on the global equalization of each of the candidate subsets, determining the target subset.

13. The method according to claim 12, wherein determining the target subset comprises: for a given candidate subset in the first group of candidate subsets and the second group of candidate subsets, in response to determining that the global equalization of the given candidate subset is higher than a threshold equalization, identifying the given candidate subset as the target subset.

14. An electronic device, comprising:
    at least one processor; and
    at least one memory, storing computer program instructions, the at least one memory and the computer program instructions being configured to cause, with the at least one processor, the electronic device to perform an action of selecting a backup destination for a backup task, the action comprising:
    in a storage device set, obtaining a first group of candidate subsets, a number of storage devices included in candidate subsets in the first group of candidate subsets being determined based on a number of copies specified by the backup task;

determining a first group of subset codes of the first group of candidate subsets, codes in the first group of subset codes uniquely identifying the candidate subsets in the first group of candidate subsets;

generating a second group of subset codes according to the first group of subset codes, codes in the second group of subset codes uniquely identifying candidate subsets; and based on the first group of candidate subsets and a second group of candidate subsets corresponding to the second group of subset codes, selecting a target subset as the backup destination of the backup task.

15. The device according to claim 14, wherein determining the first group of subset codes of the first group of candidate subsets comprises: for a given candidate subset in the first group of candidate subsets, determining the number of devices in multiple storage devices in the storage device set;

based on the number of devices, determining device codes of the multiple storage devices respectively; and based on the device code of each storage device in the given candidate subset, determining a code of the given candidate subset.

16. The device according to claim 15, wherein determining the device codes of the multiple storage devices respectively comprises: for a given storage device in the multiple storage devices, based on the number of devices, determining a length of a device code of the given storage device; and based on the length, representing the device code of the storage device in binary.

17. The device according to claim 16, wherein generating the second group of subset codes according to the first group of subset codes comprises: swapping a part of the first group of subset codes to generate the second group of subset codes.

18. The device according to claim 17, wherein swapping the part of the first group of subset codes comprises:

according to a predetermined length, dividing each subset code in the first group of subset codes into multiple segments; and swapping at least one of the multiple segments of each of the subset codes.

19. The device according to claim 16, wherein generating the second group of subset codes according to the first group of subset codes comprises:

selecting at least one subset code from the first group of subset codes;

updating at least a part of the at least one subset code to form at least one updated subset code; and based on the at least one updated subset code, determining the second group of subset codes.

20. A non-transitory machine-readable medium having instructions stored therein, which when executed by a processor, cause the processor to perform operations of selecting a backup destination for a backup task, the operations comprising:

in a storage device set, obtaining a first group of candidate subsets, a number of storage devices included in candidate subsets in the first group of candidate subsets being determined based on a number of copies specified by the backup task;

determining a first group of subset codes of the first group of candidate subsets, codes in the first group of subset codes uniquely identifying the candidate subsets in the first group of candidate subsets;

generating a second group of subset codes according to the first group of subset codes, one code in the second group of subset codes uniquely identifying one candidate subset; and based on the first group of candidate subsets and a second group of candidate subsets corresponding to the second group of subset codes, selecting a target subset as the backup destination of the backup task.

* * * * *